United States Patent
Oh et al.

(10) Patent No.: US 9,696,901 B2
(45) Date of Patent: Jul. 4, 2017

(54) APPARATUS AND METHOD FOR RECOGNIZING TOUCH OF USER TERMINAL BASED ON ACOUSTIC WAVE SIGNAL

(71) Applicant: Hyundai Motor Company, Seoul (KR)

(72) Inventors: Kwang Myung Oh, Daejeon (KR); Hui Sung Lee, Gyeonggi-do (KR); Sung Min Park, Seoul (KR); Sung Jin Sah, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 55 days.

(21) Appl. No.: 14/142,250

(22) Filed: Dec. 27, 2013

(65) Prior Publication Data

US 2015/0109216 A1    Apr. 23, 2015

(30) Foreign Application Priority Data

Oct. 23, 2013 (KR) ......................... 10-2013-0126685

(51) Int. Cl.
   *G06F 3/043*   (2006.01)
   *G06F 3/0488*  (2013.01)
   *G06F 3/041*   (2006.01)

(52) U.S. Cl.
   CPC .......... *G06F 3/04883* (2013.01); *G06F 3/041* (2013.01); *G06F 3/043* (2013.01); *G06F 3/0416* (2013.01)

(58) Field of Classification Search
   CPC . G06F 3/043–3/0436; G06F 3/0488–3/04883; G06F 1/1694; G06F 3/017
   USPC ....................................................... 345/177
   See application file for complete search history.

(56) References Cited

U.S. PATENT DOCUMENTS

| | | | |
|---|---|---|---|
| 2008/0180408 A1* | 7/2008 | Forstall et al. | 345/177 |
| 2011/0084914 A1* | 4/2011 | Zalewski | 345/173 |
| 2013/0113760 A1 | 5/2013 | Gossweiler, III et al. | |
| 2014/0208275 A1* | 7/2014 | Mongia | G06F 3/017 715/863 |

FOREIGN PATENT DOCUMENTS

| | | |
|---|---|---|
| KR | 10-2008-0050169 A | 6/2008 |
| KR | 10-2012-0002737 A | 1/2012 |
| KR | 10-2012-0004569 A | 1/2012 |
| KR | 10-2012-0100351 | 9/2012 |
| KR | 10-2013-0005335 A | 1/2013 |
| KR | 10-2013-0048578 A | 5/2013 |
| KR | 10-2013-0072562 A | 7/2013 |

OTHER PUBLICATIONS

Office Action issued on Apr. 9, 2015 in corresponding Korean Patent Application 10-2013-0126685.

* cited by examiner

*Primary Examiner* — Sanghyuk Park
(74) *Attorney, Agent, or Firm* — Mintz Levin Cohn Ferris Glovsky and Popeo, P.C.; Peter F. Corless (57) ABSTRACT

An apparatus and method for recognizing a touch of a user terminal are provided. The method includes retrieving, by a controller, an acoustic wave signal according to an input generated from an exterior and analyzing the acoustic wave signal. In addition, the controller is configured to detect a type kind and strength of the acoustic wave signal and adjust the screen data of the output unit to correspond to the detected type and strength of the acoustic wave signal.

7 Claims, 6 Drawing Sheets

| | (a) | (b) | (c) | (d) | (e) |
|---|---|---|---|---|---|
| INPUT | | | | | |
| INSTRUCTIONS | BASIC TOUCH SCROLL BY FLICKING | OPEN/CLOSE SCREEN WHICH IS VEIWING IN NEW WINDOW | CLOSE BOTH CURRENT INFORMATION WINDOWS | MOVEMENT BETWEEN OPENED INFORMATION WINDOWS | STORE CURRENT SCREEN WHICH IS VIEWING /SHORTCUT |

| INPUT | (a) | (b) | (c) | (d) | (e) |
|---|---|---|---|---|---|
| INSTRUCTIONS | BASIC TOUCH SCROLL BY FLICKING | OPEN/CLOSE SCREEN WHICH IS VIEWING IN NEW WINDOW | CLOSE BOTH CURRENT INFORMATION WINDOWS | MOVEMENT BETWEEN OPENED INFORMATION WINDOWS | STORE CURRENT SCREEN WHICH IS VIEWING /SHORTCUT |

Fig.5

APPARATUS AND METHOD FOR RECOGNIZING TOUCH OF USER TERMINAL BASED ON ACOUSTIC WAVE SIGNAL

CROSS-REFERENCE TO RELATED APPLICATION

This application is based on and claims priority from Korean Patent Application No. 10-2013-0126685, filed on Oct. 23, 2013 in the Korean Intellectual Property Office, the disclosure of which is incorporated herein in its entirety by reference.

BACKGROUND

Field of the Invention

The present invention relates to an apparatus and a method for recognizing a touch of a user terminal, and more particularly, to an apparatus and a method for recognizing a touch of a user terminal to detect a type and strength of an acoustic wave signal based on an input to control screen data displayed on an output unit.

Description of the Prior Art

In general, a user terminal such as a portable terminal, a computer, or the like retrieves information in screen data displayed on an output unit included in the user terminal by scrolling through screen data using a general sawtooth wheel type mouse, an inertia wheel type mouse, or an isometric type mouse. In addition, the screen data displayed on the output unit is retrieved by scrolling through the screen data using a flicking on a touch pad. However, the mouse has a figurative limitation and insufficient degree of space freedom and has difficulty to be used in a touch based smart device, and the touch pad has difficulty to retrieve information with an increased number of pages of the screen data since the touch pad depends on a rate of the flicking when retrieving information of the screen data.

SUMMARY

Accordingly, the present invention provides an apparatus and a method for recognizing a touch of a user terminal to detect a type and strength of acoustic wave signal for a touch generated from the user terminal including a touch screen to control screen data.

In one aspect of the present invention, an apparatus for recognizing a touch of a user terminal may include: an output unit executed by a controller to output screen data that includes an information list and a web page; an acoustic wave sensor configured to convert an acoustic wave signal for an acoustic wave generated based on an input generated from the exterior into an electrical signal; and the controller may be configured to analyze the electrical signal received from the acoustic wave sensor to detect a type and strength of the acoustic wave signal and adjust the screen data of the output unit to correspond to the detected type and strength of the acoustic wave signal.

The type of acoustic wave signal may be an acoustic wave signal generated by at least one input of a flicking or a tapping. The strength of the acoustic wave signal may be detected by an intensity of an input generated at the acoustic wave sensor. The controller may be configured to retrieve information from the screen data based on the type of acoustic wave signal. The controller may be configured to adjust a scroll retrieval region while retrieving information from the screen data based on the strength of the acoustic wave signal. In addition, the controller may be configured to represent information from the screen data based on a tapping pattern. The input may be generated by a user hand including a finger, a nail, a knuckle, and a palm of the user, or an input member.

In another aspect of the present invention, a method for recognizing a touch of a user terminal may include: receiving, by a controller, an acoustic wave signal based on an input generated from the exterior; analyzing, by the controller, the acoustic wave signal; detecting, by the controller, a type and strength of the acoustic wave signal; and adjusting, by the controller, screen data displayed on an output unit to correspond to the detected type and strength of the acoustic wave signal. In the detecting of the type and strength of the acoustic wave signal, the controller may be configured to detect that the type of acoustic wave signal generated by at least one input of a flicking or a tapping, and the strength of the acoustic wave signal may be detected by an intensity of the input. The adjustment of the screen data may include retrieving information from the screen data based on the detected type of the acoustic wave signal; and adjusting a scroll region of the screen data based on the strength of the acoustic wave signal. In the adjustment of the screen data, when the type of acoustic wave signal is the tapping, represented information from the screen data may be adjusted based on a pattern of the tapping.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in more detail with reference to the accompanying drawings. However, in describing the exemplary embodiment of the present invention, technology contents well known in the art to which the present invention pertains and directly not related to the present invention will be omitted, if possible. This is to more clearly deliver the key point of the present invention so as not to obscure the present invention by omitting an unnecessary description.

Figure 1:
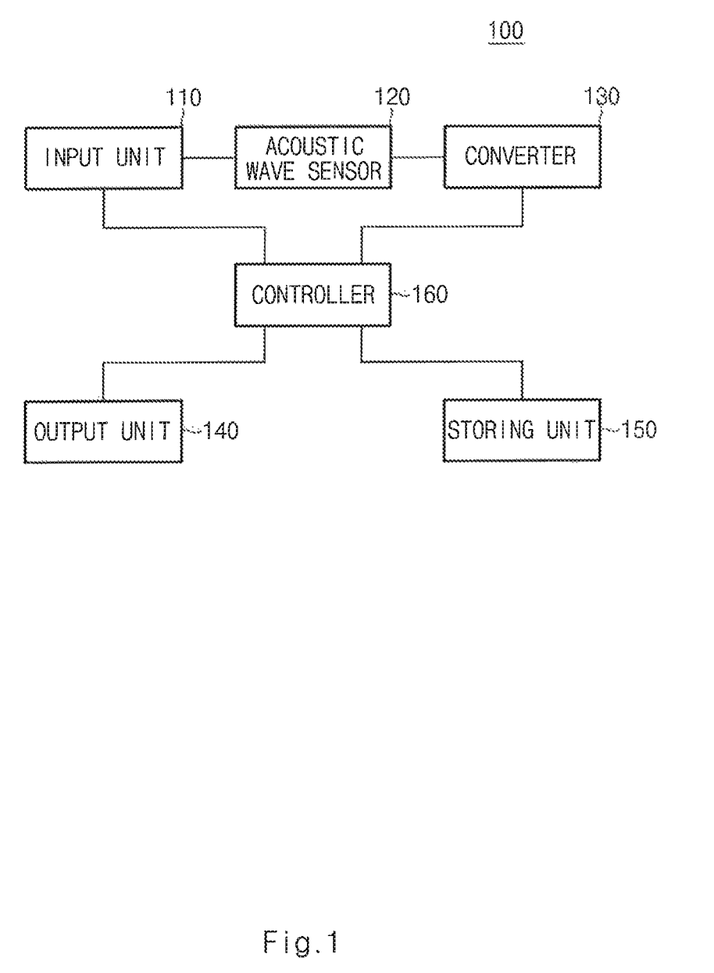
FIG. 1 is an exemplary block diagram showing main configurations of an apparatus for recognizing a touch of a user terminal according to an exemplary embodiment of the present invention.

FIG. 1 is an exemplary block diagram showing main configurations of an apparatus for recognizing a touch of a user terminal according to an exemplary embodiment of the present invention. Referring to FIG. 1, an apparatus 100 (hereinafter, referred to as a touch recognition apparatus 100) for recognizing a touch of a user terminal according to an exemplary embodiment of the present invention may include an input unit 110, an acoustic wave sensor 120, a converter 130, an output unit 140, a storing unit 150, and a controller 160. The controller 160 may be configured to execute the input unit 110, the acoustic wave sensor 120, the converter 130, the output unit 140, and the storing unit 150.

The input unit 110 may be configured to receive various information such as number information, text information, and the like, set a variety of functions, and transfer a signal input with respect to a function control of the touch recognition apparatus 100 to the controller 160. In addition, the input unit 110 may be configured by a general keypad, a touch screen or touch pad to generate an input signal based on a manipulation or a touch of a user (or an object) to receive an input from the exterior and generate a signal that corresponds to the received input to provide the generated signal to the controller 160.

The acoustic wave sensor 120 may be a microphone or a piezo sensor, and may be provided to any portion including a rear, a front, and a side of the touch recognition apparatus 100. The acoustic wave sensor 120 may be configured to convert an acoustic wave signal generated by an input generated at the acoustic wave sensor 120 into an electrical signal and then provide the converted electrical signal to the converter 130. The input generated from the acoustic wave sensor 120 may be applied with various variations such as types, strengths, and the like of the touch based on a flicking and a tapping.

The converter 130 may be configured to convert the electrical signal received from the acoustic wave sensor 120 into a digital signal and provide the digital signal to the controller 160. The output unit 140 may be configured to display screen data that includes a web page, an information list, and the like. The storing unit 150 may be configured to store functions that correspond to the types and strengths of the touch which may be input from the acoustic wave sensor 120. More specifically, the storing unit 150 may be configured to store functions of a screen control for the flicking and the tapping, respectively, and store a program, or the like to calculate a degree of the screen control based on the strength of the acoustic wave signal generated from the flicking.

The controller 160 may be configured to analyze the digital signal provided from the converter 130 to detect the types and strength of the acoustic wave signal based on the input generated at the acoustic wave sensor 120 and adjust the screen data of the output unit 140 to correspond to the detected types and strength of the acoustic wave signal. In addition, the controller 160 may be configured to detect whether the type of acoustic wave signal is the flicking or the tapping type, and detect the strength of the acoustic wave signal by the strength of the input generated at the acoustic wave sensor 120. The controller 160 may be configured to retrieve information from the screen data based on the detected type of the acoustic wave signal. More specifically, the controller 160 may be configured to set a scroll in the screen data or a movement direction and a movement range of the screen data displayed on the output unit 140 to adjust the screen data. In addition, the controller 160 may be configured to set a scroll retrieval range of the screen data and adjust the screen data of the output unit 140 based on the strength of the acoustic wave signal. The controller 160 may be configured to represent (e.g., output) information from the screen data based on a pattern of the tapping. More specifically, the controller 160 may be configured to perform functions including a multi-view between the screen data, opening new screen data, closing the screen data, switching the screen data, setting an index, storing a currently displayed screen data, and retrieving the set index.

Figure 2:
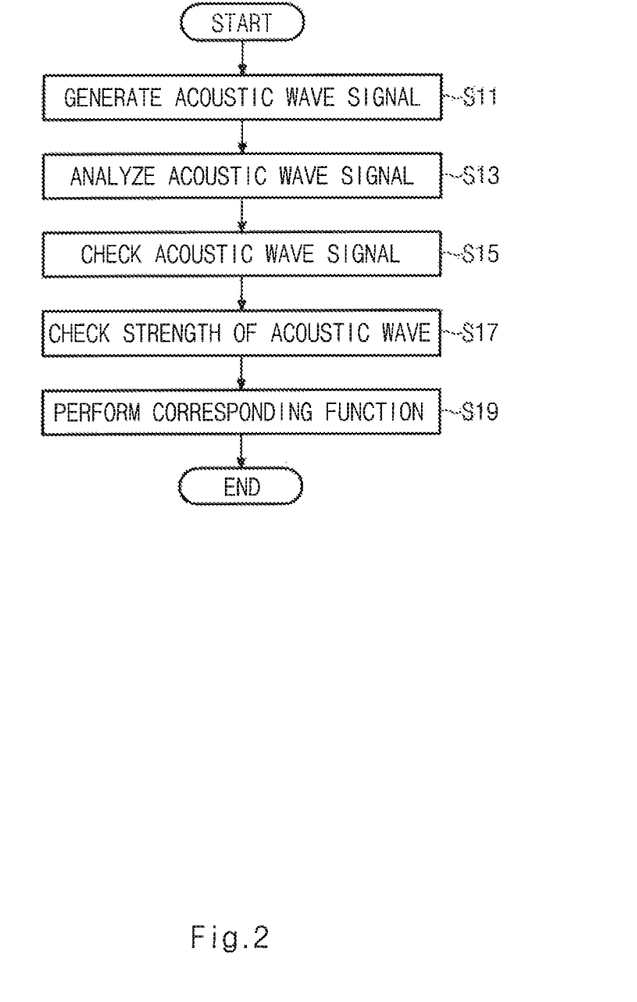
FIG. 2 is an exemplary flow chart describing a method for recognizing a touch of a user terminal according to an exemplary embodiment of the present invention.
Figure 3:
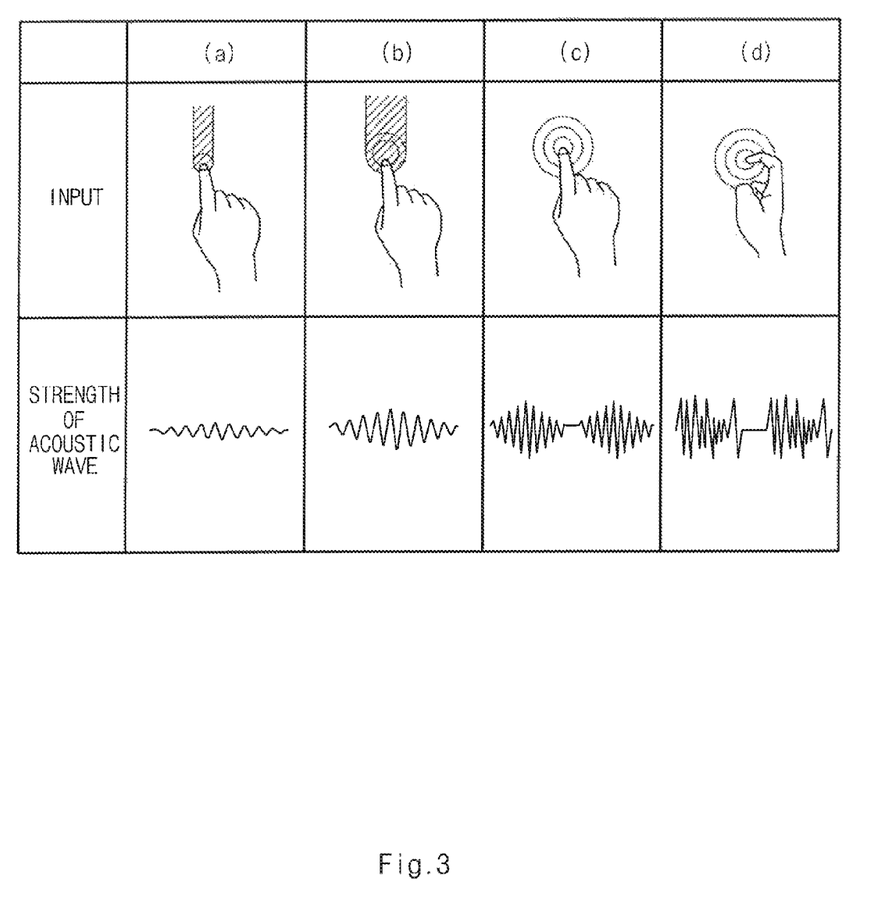
FIGS. 3 to 5 are exemplary views showing types of touches of the user terminal and examples of retrieving screen data according to an exemplary embodiment of the present invention.
Figure 4A:
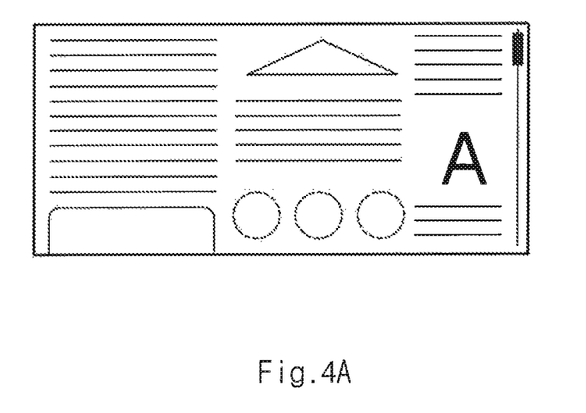
Figure 4B:
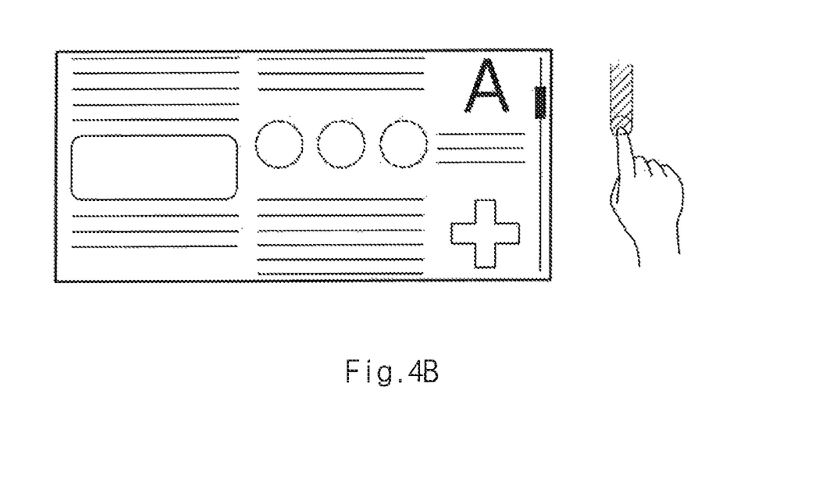
Figure 4C:
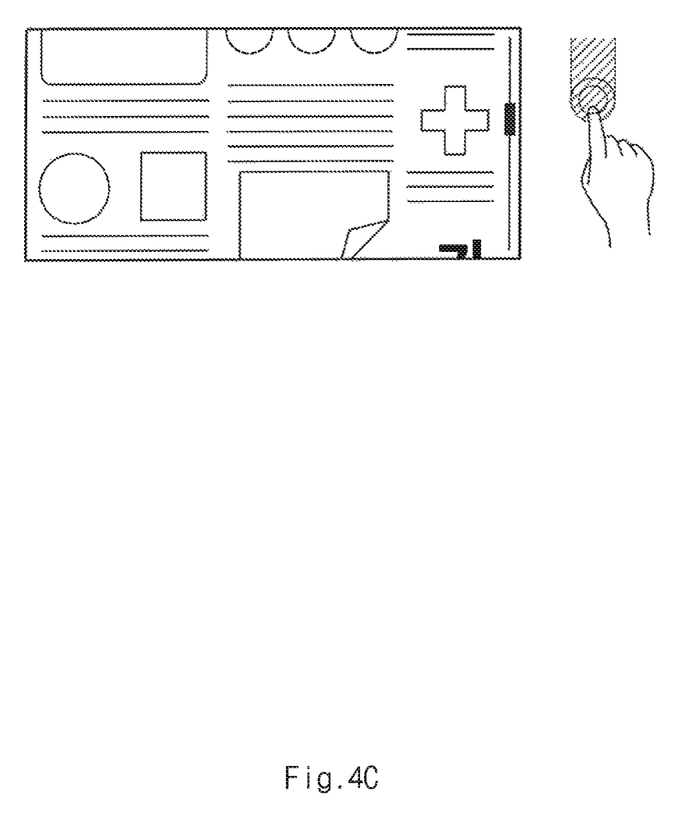
Figure 5:
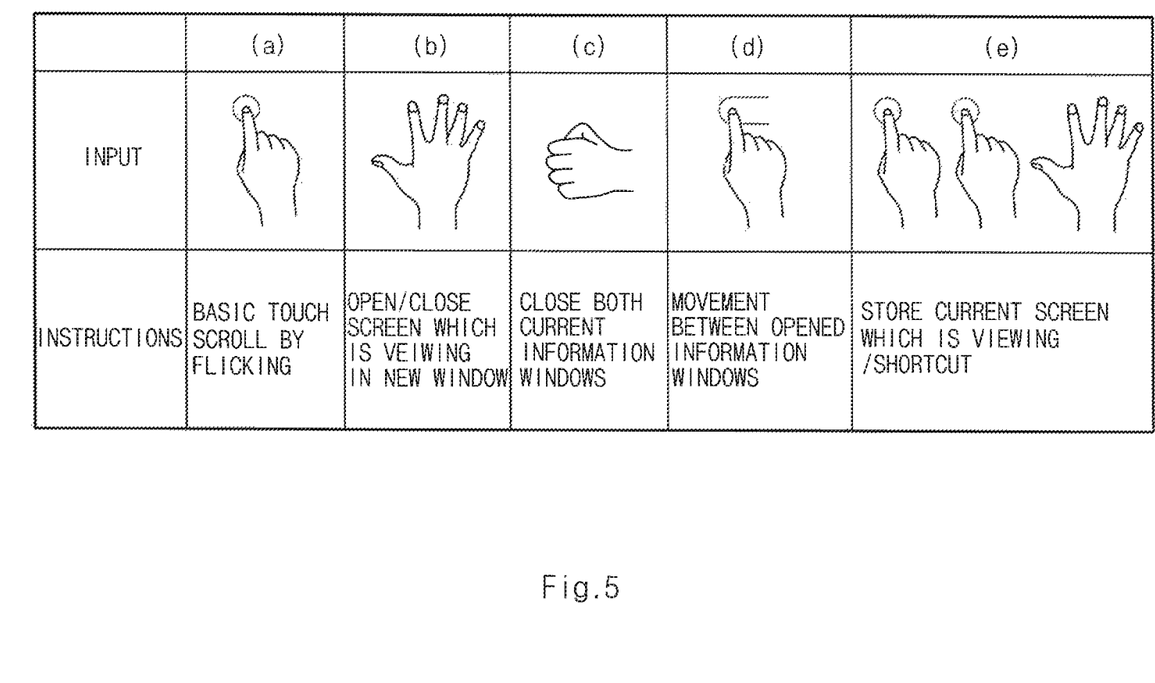

FIG. 2 is an exemplary flow chart describing a method for recognizing a touch of a user terminal according to an exemplary embodiment of the present invention. FIGS. 3 to 5 are exemplary views showing types of touches of the user terminal and examples of retrieving screen data according to an exemplary embodiment of the present invention. Referring to FIGS. 1 to 5, when the acoustic wave signal is generated from the acoustic wave sensor 120 at S11, the controller 160 may be configured to receive and analyze the generated acoustic wave signal at S13. The acoustic wave signal obtained from the acoustic wave sensor 120 may be converted into an electrical signal to be provided to the converter 130. The converter 130 may be configured to convert the electrical signal into a digital signal and provide the digital signal to the controller 160. Finally, the controller 160 may be configured to analyze the digital signal received from the converter 130.

Furthermore, at S15, the controller 160 may be configured to detect a type of acoustic wave signal from the analyzed acoustic wave signal. Referring to FIG. 3, (a) and (b) in FIG. 3 represent that a user flicks a position including the acoustic wave sensor 120, and (c) and (d) in FIG. 3 represent that the user taps a position including the acoustic wave sensor 120. As shown in FIG. 3, since the acoustic wave signal may have different shapes generated based on the flicking or the tapping, the controller 160 may be configured to detect whether the input through the position including the acoustic wave sensor 120 is the flicking or the tapping by the analysis of the acoustic wave signal.

At S17, the controller 160 may be configured to detect the strength of the acoustic wave signal. Referring to FIG. 3, the acoustic wave signal may change based on the strength of the flicking or the tapping. In other words, the controller may be configured to detect that the strength of the acoustic wave signal generated during flicking as shown in (b) of FIG. 3 is greater than that of flicking as shown in (a) of FIG. 3, and the strength of the acoustic wave signal generated during tapping by a nail as shown in (d) of FIG. 3 is greater than that of tapping by a finger as shown in (c) of FIG. 3.

Further, at S19, the controller 160 may be configured to retrieve information from the screen data output to the output unit 140 to adjust the information to correspond to the detected type and strength of the acoustic wave signal from S15 and S17. When the screen data as shown in FIG. 4A is displayed on the output unit 140, when the flicking as shown in (a) of FIG. 3 is input, the controller 160 may be configured to decrease a scroll amount as shown in FIG. 4B to slightly scroll the screen data (e.g., decrease the scrolling), and when the flicking as shown in (b) of FIG. 3 is input, the controller 160 may be configured to increase the scroll amount as shown in FIG. 4C to significantly scroll the screen data (e.g., increase the scrolling). Although not shown, when the screen data shown in FIG. 4A is displayed, when the finger tapping as shown in (c) of FIG. 3 is input, the controller 160 may not be configured to scroll the screen data and may move downwardly by a specific range, and when the nail tapping as shown in (d) of FIG. 3 is input, the controller 160 may be configured to upwardly move the screen data by a specific range. In particular the movement direction and the movement range of the screen data may be pre-set and may be set by the user.

Moreover, the storing unit 150 may be configured to store functions based on a portion of hand and the type of acoustic wave signal used for generating the input at the position including the acoustic wave sensor 120 as shown in FIG. 5. When describing a case in which the screen data displayed on the output unit 140 is the web page, as an example, when the acoustic wave signal detected by the controller 160 is a flicking as shown in (a) of FIG. 5, the controller 160 may be configured to scroll the web page displayed on the output unit 140 to correspond to the input flicking. In particular, the controller 160 may be configured to detect input strength of the flicking as shown in FIG. 3 to set the scroll retrieval range, that is, the scroll amount, of the web page displayed on the output unit 140 to correspond to the detected strength of the acoustic wave signal.

According to the exemplary embodiment of the present invention, the scheme of retrieving information displayed on the output unit 140 based on the strength of the acoustic wave signal may be adjusted, to adjust a movement speed between lines of information displayed on the output unit 140 and the movement speed and a movement range may be set based on the type of the generated acoustic wave signal. Further, according to the exemplary embodiment of the present invention, an information list may be displayed to include specific information such as a list of music data, a movement between information such as one song movement, a movement of several songs, a movement between folders, and the like based on the type and strength of the acoustic wave signal, to control the scheme of retrieving information.

When the acoustic wave signal detected by the controller 160 is the acoustic wave signal generated by a palm as shown in (b) of FIG. 5, the controller 160 may be configured to represent information from the screen data. In other words, the controller 160 may be configured to open the same web page as the web page displayed on the output unit 140 in a new window, or terminate the web page displayed on the output unit 140. When the acoustic wave signal detected by the controller 160 is the acoustic wave signal generated by a knuckle as shown in (c) of FIG. 5, the controller 160 may be configured to terminate both the web page currently displayed on the output unit 140 and a web page currently executed in the touch recognition apparatus 100. In addition, when the acoustic wave signal detected by the controller 160 is the acoustic wave signal by the flicking generated horizontally rather than vertically as shown in (d) of FIG. 5, the controller 160 may be configured to perform a movement between web pages which are executing to display another web page rather than the currently displayed web page on the output unit 140. When the acoustic wave signal detected by the controller 160 is the acoustic wave signal generated by a finger tapping and the palm as shown in (e) of FIG. 5, the controller 160 may be configured to capture and store a screen of the web page currently displayed on the output unit 140, or set a currently displayed web page shortcut.

Particularly, although not shown, when a specific pattern is found in the acoustic wave signal generated from the tapping, the controller 160 may be configured to detect a function mapped to a specific pattern which may be pre-stored in the storing unit 150 and perform the functions including the scheme of representing information in the screen data, that is, the multi-view between the screen data, opening new screen data, closing the screen data, switching the screen data, setting an index, storing a currently displayed screen data, and retrieving the set index according to the specific pattern.

As set forth above, according to the exemplary embodiments of the present invention, the type and the strength of the acoustic wave signal for the touch generated from the user terminal including the touch screen may be detected to adjust the screen data, such that the information retrieval may be further performed in the screen data by various touches.

Hereinabove, the apparatus and the method for recognizing the touch of the user terminal according to the exemplary embodiments of the present invention have been described with reference to the exemplary embodiment of the present invention. The exemplary embodiments of the present invention have been disclosed in the present specification and the accompanying drawings and specific terms have been used, but are just used in a general meaning in order to easily describe the technical content of the present invention and assist in understanding the present invention and do not limit the scope of the present invention. It is obvious to those skilled in the art to which the present invention pertains that various modifications may be practiced based on the technical idea of the present invention, in addition to the exemplary embodiments disclosed herein.

What is claimed is:
1. An apparatus for recognizing a touch of a user terminal, the apparatus comprising:
 a memory configured to store program instructions; and
 a processor configured to execute the program instructions, the program instructions when executed configured to:

receive various information such as number information and text information, set a variety of functions, and transfer a signal input with respect to a function control of the apparatus for recognizing a touch of a user terminal to a controller;

output screen data that includes an information list and a web page;

convert an acoustic wave signal received from an acoustic wave sensor for a generated acoustic wave based on an input generated from an exterior into an electrical signal;

analyze the electrical signal to detect a type and strength of the acoustic wave signal; and adjust the screen data of an output unit to correspond to a detected type and strength of the acoustic wave signal, wherein the type of acoustic wave signal is an acoustic wave signal generated by at least one input of a combination of types of touch motions including a fist, a palm, or a finger motion, wherein the program instructions when executed are configured to adjust a scroll retrieval region while retrieving information from the screen data based on the strength and the type of the acoustic wave signal and detect a function mapped to a specific pattern which is pre-stored in a storing unit and perform the function including a scheme of representing information in the screen data based on a pattern of the tapping motion, and wherein the controller is configured to capture and store a screen of the web page currently displayed on the output unit or set a currently displayed web page shortcut in case of the acoustic wave signal generated by a finger tapping and the palm.

2. The apparatus according to claim 1, wherein the strength of the acoustic wave signal is detected by an intensity of an input generated at the acoustic wave sensor.

3. The apparatus according to claim 2, wherein the program instructions when executed are configured to retrieve information from the screen data based on the type of acoustic wave signal.

4. The apparatus according to claim 1, wherein the input is generated by a hand of a user including a finger, a nail, a knuckle, and a palm of the user, or an input member.

5. A method for recognizing a touch of a user terminal, the method comprising:

receiving, by a controller, an acoustic wave signal according to an input generated from an exterior;

analyzing, by the controller, the acoustic wave signal;

detecting, by the controller, a type and strength of the acoustic wave signal; and adjusting, by the controller, screen data displayed on an output unit to correspond to a detected type and strength of the acoustic wave signal, wherein in the detecting of the type and strength of the acoustic wave signal, the controller is configured to detect the type of acoustic wave signal generated by at least one input of a combination of types of touch motions including a fist, a palm, or a finger motion, and wherein the strength of the acoustic wave signal is detected by an intensity of the input and the adjusting of the screen data includes:

retrieving, by the controller, information from the screen data based on the detected type of acoustic wave signal;

adjusting, by the controller, a scroll region of the screen data based on the strength and the type of the acoustic wave signal and detecting a function mapped to a specific pattern pre-stored in a storing unit and performing the function including a scheme of representing information in the screen data based on a pattern of the tapping motion; and capturing and storing, by the controller, a screen of the web page currently displayed on the output unit or set a currently displayed web page shortcut in case of the acoustic wave signal generated by a finger tapping and the palm.

6. A non-transitory computer readable medium containing program instructions executed by a controller, the computer readable medium comprising:

program instructions that retrieve an acoustic wave signal according to an input generated from an exterior;

program instructions that analyze the acoustic wave signal;

program instructions that detect a type and strength of the acoustic wave signal; and program instructions that adjust screen data displayed on an output unit to correspond to a detected type and strength of the acoustic wave signal, wherein the type of acoustic wave signal is an acoustic wave signal generated by at least one input of a combination of types of touch motions including a fist, a palm, or a finger motion, wherein the computer readable medium includes program instructions that adjust a scroll retrieval region while retrieving information from the screen data based on the strength and the type of the acoustic wave signal and detect a function mapped to a specific pattern pre-stored in a storing unit and perform the function including a scheme of representing information in the screen data based on a pattern of the tapping motion, and wherein the computer readable medium includes program instructions that capture and store a screen of the web page currently displayed on the output unit or set a currently displayed web page shortcut in case of the acoustic wave signal generated by a finger tapping and the palm.

7. The non-transitory computer readable medium of claim 6, further comprising:

program instructions that retrieve information from the screen data based on the detected type of the acoustic wave signal; and program instructions that adjust a scroll region of the screen data based on the strength of the acoustic wave signal.

* * * * *